United States Patent
Kemoun

(10) Patent No.: US 7,927,404 B2
(45) Date of Patent: Apr. 19, 2011

(54) REACTOR HAVING A DOWNCOMER PRODUCING IMPROVED GAS-LIQUID SEPARATION AND METHOD OF USE

(75) Inventor: Abdenour Kemoun, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 785 days.

(21) Appl. No.: 12/002,771

(22) Filed: Dec. 19, 2007

(65) Prior Publication Data

US 2009/0159537 A1 Jun. 25, 2009

(51) Int. Cl.
*B01D 45/12* (2006.01)

(52) U.S. Cl. ............... 95/269; 55/445; 55/456; 55/457; 95/272; 422/227; 422/147

(58) Field of Classification Search .............. 55/454, 55/455, 456, 457, 462, 465; 95/267, 269, 95/270; 422/140, 227, 230, 231; 518/700, 518/701
See application file for complete search history.

(56) References Cited

U.S. PATENT DOCUMENTS

| | | | |
|---|---|---|---|
| 3,698,876 A * | 10/1972 | Gregoli et al. | 422/230 |
| 4,173,527 A * | 11/1979 | Heffley et al. | 208/153 |
| 4,219,407 A * | 8/1980 | Haddad et al. | 208/151 |
| 4,268,277 A * | 5/1981 | Rooker | 95/269 |
| 4,310,411 A * | 1/1982 | Wilkening | 208/153 |
| 4,354,852 A * | 10/1982 | Kydd | 95/1 |
| 4,404,095 A * | 9/1983 | Haddad et al. | 208/161 |
| 4,457,834 A | 7/1984 | Caspers et al. | |
| 4,482,451 A * | 11/1984 | Kemp | 208/161 |
| 4,539,183 A | 9/1985 | Clark et al. | |
| 4,572,780 A * | 2/1986 | Owen et al. | 208/161 |
| 4,875,995 A | 10/1989 | Van Driesen et al. | |
| 4,925,638 A | 5/1990 | Chakravarti et al. | |
| 4,960,571 A | 10/1990 | Bhagat et al. | |
| 5,021,147 A | 6/1991 | Van Driesen et al. | |
| 5,139,748 A * | 8/1992 | Lomas et al. | 422/140 |
| 5,308,476 A * | 5/1994 | Buttke et al. | 208/157 |
| 5,624,642 A * | 4/1997 | Devanathan et al. | 422/140 |
| 6,183,702 B1 | 2/2001 | Nguyen et al. | |
| 6,278,034 B1 | 8/2001 | Espinoza et al. | |
| 6,454,932 B1 | 9/2002 | Baldassari et al. | |
| 6,645,369 B1 * | 11/2003 | Boyer et al. | 208/100 |
| 6,692,552 B2 * | 2/2004 | Benham | 95/269 |
| 6,726,832 B1 | 4/2004 | Baldassari et al. | |
| 7,303,733 B2 * | 12/2007 | Boyer et al. | 422/243 |

(Continued)

OTHER PUBLICATIONS

U.S. Appl. No. 12/002,769, filed Dec. 19, 2007, inventor Abdenour Kemoun.

(Continued)

*Primary Examiner* — Duane Smith
*Assistant Examiner* — Sonji Turner

(57) ABSTRACT

A downcomer for a reactor for downwardly conducting a multi-phase mixture, the downcomer includes a transport section having an interior comprised of inner and outer regions separated horizontally by a vertical barrier, and a baffle structure disposed on an inner surface of the barrier. The baffle structure is arranged to induce the mixture to flow in a downward generally helical path such that denser components of the mixture are centrifugally urged outwardly away from a center of the downcomer and less dense components migrate toward the center. The barrier includes openings enabling the denser components to travel from the inner region to the outer region to be collected herein.

19 Claims, 3 Drawing Sheets

U.S. PATENT DOCUMENTS

| | | | |
|---|---|---|---|
| 2002/0189452 A1* | 12/2002 | Benham | 95/269 |
| 2004/0040892 A1* | 3/2004 | Boyer et al. | 208/308 |
| 2006/0078483 A1 | 4/2006 | Kemoun et al. | |
| 2007/0138055 A1 | 6/2007 | Farshid et al. | |
| 2007/0140927 A1 | 6/2007 | Reynolds | |
| 2007/0284107 A1 | 12/2007 | Crichlow | |

OTHER PUBLICATIONS

U.S. Appl. No. 12/002,772, filed Dec. 19, 2007, inventor Abdenour Kemoun.

U.S. Appl. No. 12/002,770, filed Dec. 19, 2007, inventor Abdenour Kemoun.

* cited by examiner

REACTOR HAVING A DOWNCOMER PRODUCING IMPROVED GAS-LIQUID SEPARATION AND METHOD OF USE

FIELD OF ART

Disclosed is a downcomer, for example, used in a reactor for upgrading heavy hydrocarbons.

BACKGROUND

It has been proposed to upgrade heavy hydrocarbons via hydroprocessing in which the hydrocarbons are admixed with an active catalyst composition in liquefied slurry form. As disclosed in U.S. Published Application No. 2007/0140927, the disclosure of which is incorporated herein by reference, a feed of heavy hydrocarbons and catalyst slurry is introduced into the lower portion of a reactor chamber, along with hydrogen in a gas phase. Those components travel upwardly within the chamber, enabling the hydrogen to react with, and hydrogenate, the hydrocarbons. Near an upper portion of the chamber, the hydrogenated hydrocarbons are removed as is excess hydrogen gas.

A flow of liquefied catalyst slurry and residual hydrogen gas is recirculated within the chamber through a vertically oriented downcomer in the chamber. Such a multi-phase mixture enters an upper end of the downcomer, for example, under the action of a recirculation pump. The mixing which occurs in the downcomer tends to keep the catalyst concentration profile and the temperature profile generally uniform along the height of the reactor.

It is desirable to separate gas from the multi-phase mixture descending through the downcomer, because the gas resists the downward flow of the mixture and reduces the efficiency of any pumps which can be provided to recirculate the mixture exiting the downcomer. Therefore, at or near its upper end the downcomer is typically provided with a degassing section, e.g., in the form of a generally frusto-conical pan which is upwardly open and leads downwardly to a usually cylindrical transport section of the downcomer. Due to the degassing section being of relatively large diameter, travel of the multi-phase mixture therein is slower than the natural ascension velocity of the hydrogen gas bubbles, thereby facilitating escape of the bubbles from the rest of the multi-phase flow.

That bubble escape reduces the overall resistance to downward flow of the multi-phase mixture, increases pump efficiency, and improves mixing among other advantages. It would be desirable to yet further reduce the bubble content in the multi-phase mixture.

In certain reactions, the deactivated catalyst becomes heavier, e.g., finely divided activated carbon used in a resid process. It would be desirable to further promote the separation of heavy (deactivated) catalyst from the unreacted catalyst before the mixture exits the downcomer, so that the heavy catalyst can be re-directed for regeneration.

SUMMARY

One aspect of the present disclosure relates to a downcomer for a reactor for downwardly conducting a multi-phase mixture. The downcomer comprises an interior in which is disposed a baffle structure arranged to induce the mixture to flow in a downward generally helical path such that denser components of the mixture are centrifugally urged outwardly away from a center of the downcomer and less dense components migrate toward the center.

In an embodiment, the downcomer comprises a transport section having an interior comprised of inner and outer regions separated horizontally by a vertical barrier, and a baffle structure disposed on an inner surface of the barrier. The baffle structure is arranged to induce the mixture to flow in a downward generally helical path such that denser components of the mixture are centrifugally urged outwardly away from a center of the downcomer and less dense components migrate toward the center. The barrier includes openings enabling the denser components to travel from the inner region to the outer region to be collected herein.

Another aspect of the present disclosure involves a method of separating components of a multi-phase mixture in a downcomer of a reactor, comprising:

A. feeding the mixture into an interior of the downcomer; and

B. inducing the mixture to flow in a downward, generally helical direction, wherein denser components are centrifugally urged away from a center of the interior, and less dense components migrate toward the center.

In an embodiment, step A involves feeding the mixture into an inner region of the downcomer's interior, which inner region is separated by a barrier from an outer region of the downcomer's interior. Step B involves inducing the mixture to flow in a downward generally helical direction in the inner region, wherein denser components of the mixture are centrifugally urged away from a center of the downcomer, and less dense components migrate toward the center. Step C involves admitting the centrifugally urged denser components into the outer region through openings formed in the barrier.

The present disclosure also pertains to a method wherein the downcomer receives a mixture of heavy hydrocarbons, a catalyst slurry, and hydrogen gas.

DETAILED DESCRIPTION

Figure 1:
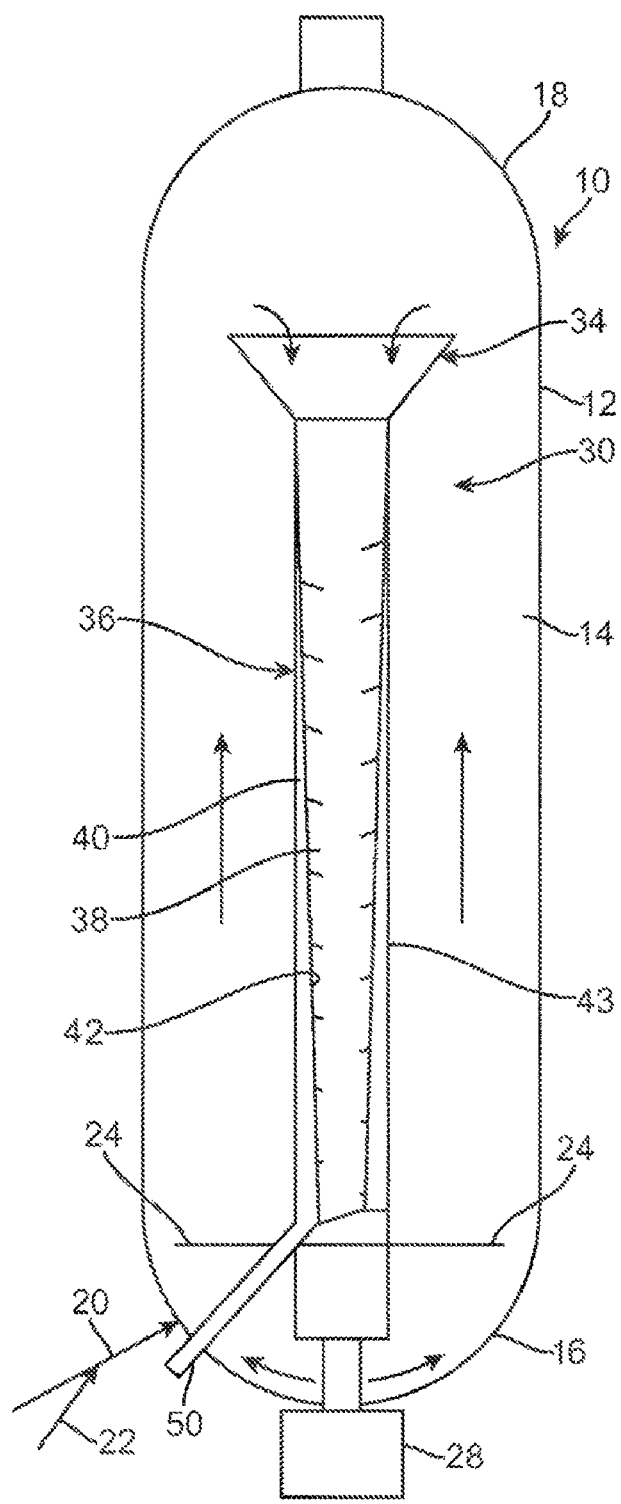
FIG. 1 is a schematic side view of a reactor according to the present disclosure.
Figure 2:
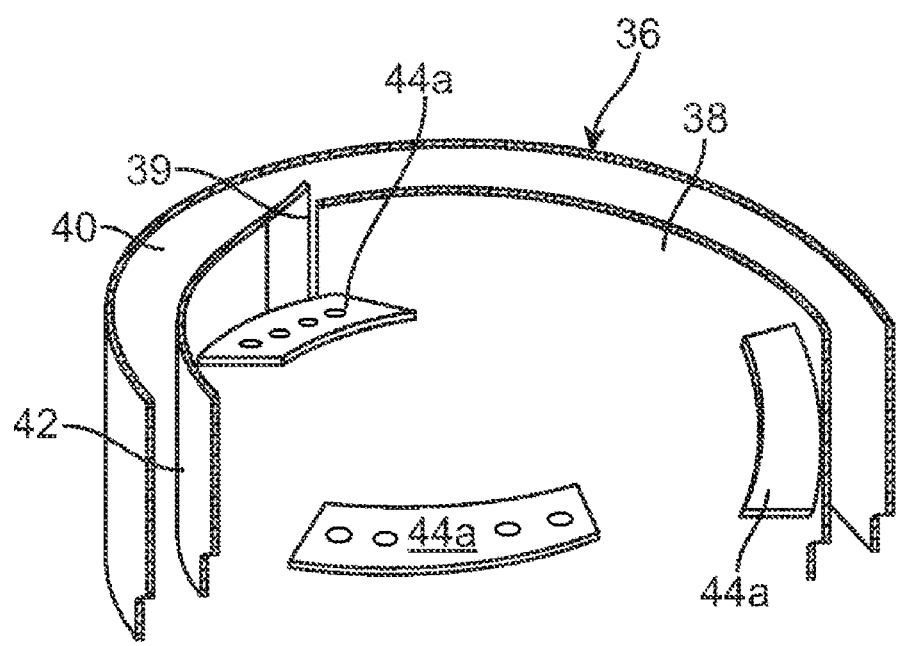
FIG. 2 is a fragmentary cut-away perspective view of a downcomer according to the present disclosure.

FIG. 1 is a schematic view of a reactor 10 embodying the present disclosure. The reactor 10 comprises a cylindrical casing 12 forming an inner reaction chamber 14. A lower end piece 16 and a roof 18 are also provided to close off the ends of the chamber. A feed of heavy hydrocarbons and liquefied catalyst slurry is introduced into a lower portion of the chamber 14 through line 20, and hydrogen gas is supplied via line 22. Alternatively, those components could be supplied in other ways. The multi-phase mixture of hydrocarbons, liquefied slurry and hydrogen gas can be distributed by a distributor 24 located near the bottom of the chamber.

As the multi-phase mixture rises in the chamber 14, the hydrocarbons react with the hydrogen and are hydrogenated. The hydrogenated hydrocarbons and some unreacted gases are removed at upper portions of the chamber.

Circulation of the multi-phase mixture within the chamber can be induced by a pump 28 which produces a downward flow of the multi-phase mixture through a vertical downcomer 30 disposed in the reactor. The downcomer 30 has open upper and lower ends. The multi-phase mixture, comprising hydrocarbons, liquefied slurry and hydrogen gas, is drawn into the open upper end of the downcomer and discharged into the lower portion of the chamber.

The upper portion of the downcomer 30 is configured to increase the residence time of the mixture therein such that the downward velocity thereof is slower than the natural ascension velocity of the gas bubbles, to promote escape of the bubbles which would otherwise tend to impede the downward flow of the mixture. Thus, an upper portion of the downcomer typically includes a frusto-conical degassing section 34 which feeds downwardly into a cylindrical transport section 36 of the downcomer whose diameter is less than a maximum diameter of the degassing section 34.

As the mixture descends toward the transport section 36, bubbles escape upwardly and are drawn from the chamber and possibly reintroduced into a lower portion of the chamber.

Figure 3:
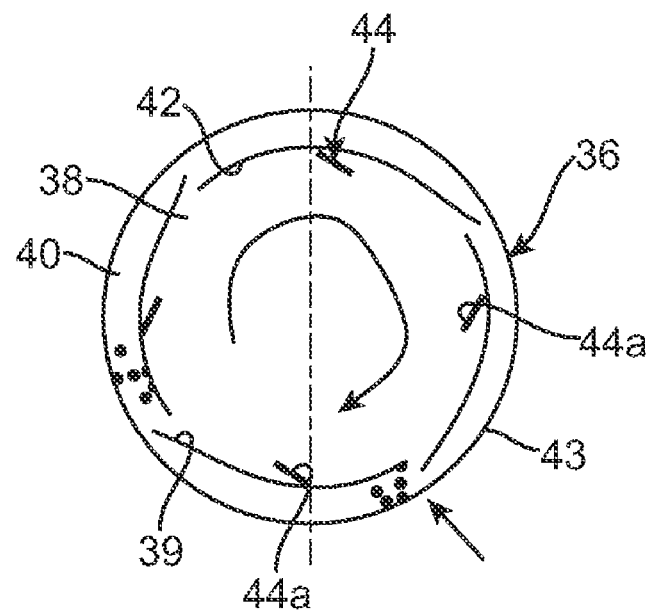
FIG. 3 is a cross sectional view through a transport section of the downcomer.

The interior of the transport section 36 of the downcomer includes an inner or central region 38 and an outer region 40 that is separated radially (horizontally) from the inner region 38 by a vertical barrier 42 that is spaced from an outer wall 43 of the transport section. The outer region can be in the form of a continuous annular region as shown in FIG. 3, but alternatively could be divided into separate circumferentially adjacent regions. Openings 39 are provided in the barrier to communicate the outer and inner regions with one another.

Mounted on a radially inner surface of the barrier 40 is a baffle structure 44 arranged to induce the mixture to travel downwardly in a helical path. The baffle structure is arranged in a helicoidally path and can be perforated, in order to prevent solids from clogging along the baffle structure. The perforating of the baffle structure can be accomplished by providing holes in a continuous helical baffle (not shown) or by making the helical baffle structure discontinuous, i.e., comprised of spaced apart baffle sections 44a as depicted.

As the multi-phase mixture travels downwardly in a helical direction through the transport section 36, the mixture is subjected to centrifugal force, causing the heavier (denser) components, such as a heavy (deactivated) catalyst, to be centrifugally urged radially outwardly away from the center of the transport section, whereupon the lighter (less dense) components, e.g., light (active) catalyst and gas bubbles, will migrate toward the center of the downcomer. This promotes the coalesence of small bubbles into larger bubbles having a greater tendency to rise in the inner region and escape from the downcomer.

The baffle sections 44a do not extend all the way to the center of the downcomer, so a vertical passage is created for the upward flow of the gas bubbles, facilitating their escape, as well as enabling the lighter catalyst to flow downwardly.

Figure 4:
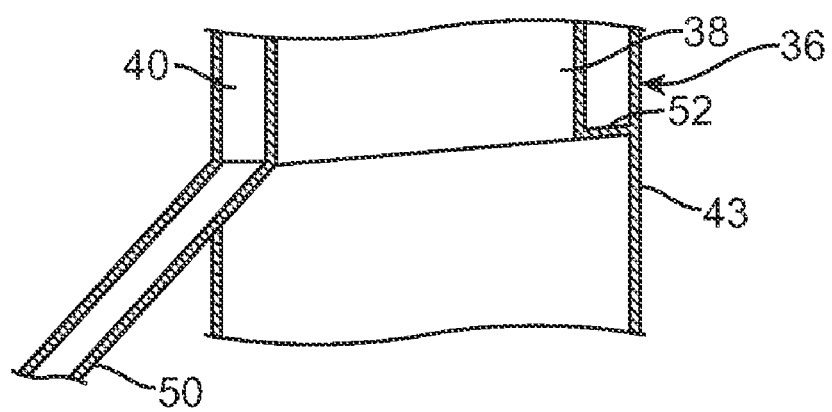
FIG. 4 is a fragmentary vertical sectional view showing an inclined floor of the downcomer.

The heavier components being centrifugally urged outwardly will pass through the openings 39 in the barrier 42 and be collected in the outer region 40. Those heavier components, including hydrocarbons and catalyst slurry, move downwardly in the outer region and can be discharged from the reaction chamber through a discharge pipe 50 and sent, for example, to a regeneration station. To promote that discharge, the floor 52 of the outer region can be declined downwardly toward the discharge pipe as shown in FIG. 4.

Since the amount of denser components collected in the outer region becomes greater toward the lower portion of the downcomer, the width, i.e., radial dimension, of the outer region 40 can be made progressively greater in the downward direction in order to accommodate the increasingly received amounts of denser components.

In accordance with the present disclosure, gas is removed from the mixture in the downcomer to facilitate the descent of the mixture through the downcomer and any subsequent recirculation thereof. Also, a heavy deactivated catalyst is effectively removed from mixture in the downcomer, and can be recirculated to a regeneration station.

Many modifications of the exemplary embodiments disclosed herein will readily occur to those of skill in the art. Accordingly, the present disclosure is to be construed as including all structure and methods that fall within the scope of the appended claims.

What is claimed is:

1. A downcomer for a reactor for downwardly conducting a multi-phase mixture, the downcomer comprising an interior in which is disposed a baffle structure arranged to induce the mixture to flow in a downward generally helical path such that denser components of the mixture are centrifugally urged outwardly away from a center of the downcomer and less dense components migrate toward the center, wherein the baffle structure comprises a plurality of spaced apart baffle sections arranged in a downward generally helical path, and wherein an upper section of the downcomer includes a frusto-conical degassing section which feeds downwardly into a cylindrical transport section having a diameter which is less than a maximum diameter of the degassing section.

2. The downcomer according to claim 1, wherein the baffle structure is perforated.

3. A downcomer for a reactor for downwardly conducting a multi-phase mixture, the downcomer comprising:
   a transport section having an interior comprised of inner and outer regions separated horizontally by a generally vertical barrier;
   a frusto-conical degassing section which feeds downwardly into the transport section,
   a baffle structure disposed on an inner surface of the barrier and arranged to induce the mixture to flow in a downward generally helical path such that denser components of the mixture are centrifugally urged outwardly away from a center of the downcomer and less dense components migrate toward the center, the baffle structure comprises a plurality of spaced apart baffle sections arranged in a downward generally helical path;
   wherein the barrier includes openings enabling the denser components to travel from the inner region to the outer region to be collected herein, and wherein the transport section has a diameter which is less than a maximum diameter of the degassing section.

4. The downcomer according to claim 3, wherein the baffle structure is perforated.

5. The downcomer according to claim 4, wherein the outer region comprises a continuous annular region surrounding the inner region.

6. The downcomer according to claim 3, wherein the outer region comprises an annular region surrounding the inner region.

7. The downcomer according to claim 3, further including a discharge passage for conducting the collected denser components from the outer region.

8. The downcomer according to claim 3, wherein the outer region becomes progressively horizontally wider toward a lower portion of the downcomer.

9. The downcomer according to claim 3, wherein the transport section is cylindrical.

10. A method of separating components of a multi-phase mixture in a downcomer of a reactor, comprising:
   A. feeding the mixture into an interior of a downcomer having an interior in which is disposed a baffle structure comprising a plurality of spaced apart baffle sections arranged in a downward generally helical path; and B. inducing the mixture to flow in a downward, generally helical direction, wherein denser components are centrifugally urged away from a center of the interior, and less dense components migrate toward the center.

11. The method according to claim 10, wherein step B comprises guiding the mixture along the generally downward helically arranged baffle structure disposed in the interior.

12. The method according to claim 10, wherein the plurality of spaced apart baffle sections are perforated.

13. The method according to claim 10, wherein the downcomer includes a generally frusto-conical degassing section which feeds into a transport section and wherein the transport section has a diameter which is less than a maximum diameter of the degassing section.

14. The method according to claim 13, wherein step B comprises conducting the mixture along the generally frusto-conical section of the downcomer which feeds the mixture into the transport section.

15. A method of separating components of a multi-phase mixture in a downcomer of a reactor, comprising:
A. feeding the mixture into an inner region of the downcomer's interior, which inner region is separated by a barrier from an outer region of the downcomer's interior,
B. inducing the mixture to flow down a plurality of spaced apart baffle sections arranged in a downward generally helical path of the downcomer's interior, wherein denser components of the mixture are centrifugally urged away from a center of the downcomer, and less dense components migrate toward the center, and
C. admitting the centrifugally urged denser components into the outer region through openings formed in the barrier.

16. The method according to claim 15, wherein step B comprises guiding the mixture along a generally helically arranged baffle structure disposed on an inside surface of the barrier.

17. The method according to claim 15, wherein step B is performed in a cylindrical transport section of the downcomer, the method further comprising, prior to step A, conducting the mixture along a generally frusto-conical section of the downcomer which feeds the mixture into the transport section in step B.

18. The method according to claim 15, wherein the mixture comprises heavy catalyst and hydrogen gas, wherein the light catalyst and the hydrogen gas bubbles migrate toward the center in step B.

19. The method according to claim 18, wherein the heavy catalyst passes centrifugally through the openings into the outer region and are removed from the outer region and from the reactor.

* * * * *